(12) United States Patent
Ihara et al.

(10) Patent No.: US 7,045,278 B2
(45) Date of Patent: May 16, 2006

(54) CORNER CUBE ARRAY AND METHOD OF MAKING THE CORNER CUBE ARRAY

(75) Inventors: Ichiro Ihara, Nishinomiya (JP); Kiyoshi Minoura, Tanri (JP)

(73) Assignee: Sharp Kabushiki Kaisha, Osaka (JP)

( * ) Notice: Subject to any disclaimer, the term of this patent is extended or adjusted under 35 U.S.C. 154(b) by 484 days.

(21) Appl. No.: 10/603,793

(22) Filed: Jun. 26, 2003

(65) Prior Publication Data

US 2004/0004765 A1    Jan. 8, 2004

(30) Foreign Application Priority Data

Jun. 27, 2002 (JP) ............... 2002-187891
Jun. 5, 2003 (JP) ............... 2003-160345

(51) Int. Cl.
*G02F 1/1335* (2006.01)
(52) U.S. Cl. .............. 430/321; 359/530; 359/851; 216/2; 216/24
(58) Field of Classification Search ............... None
See application file for complete search history.

(56) References Cited

U.S. PATENT DOCUMENTS

| | | | |
|---|---|---|---|
| 3,905,682 A | | 9/1975 | Meyerbhofer |
| 4,992,699 A | * | 2/1991 | McClure et al. ............ 313/525 |
| 5,182,663 A | | 1/1993 | Jones |
| 6,067,134 A | | 5/2000 | Akiyama et al. |
| 6,461,003 B1 | * | 10/2002 | Neudeck ................... 359/529 |
| 2001/0040717 A1 | | 11/2001 | Minoura et al. |
| 2002/0149721 A1 | | 10/2002 | Minoura et al. |
| 2002/0154408 A1 | | 10/2002 | Minoura et al. |
| 2003/0053015 A1 | * | 3/2003 | Minoura et al. ............ 349/113 |

FOREIGN PATENT DOCUMENTS

| | | |
|---|---|---|
| JP | 54-105998 A | 8/1979 |
| JP | 3-186816 | 8/1991 |
| JP | 07-205322 | 8/1995 |
| JP | 8-321483 A | 12/1996 |
| JP | 9-076245 | 3/1997 |
| JP | 10-260427 | 9/1998 |
| JP | 11-007008 A | 1/1999 |
| JP | 2000-19490 A | 1/2000 |
| JP | 2000-221497 | 8/2000 |
| WO | 98/57212 | 12/1998 |

OTHER PUBLICATIONS

U.S. Appl. No. 10/171,651, filed Jun. 2002, Minoura et al.

(Continued)

*Primary Examiner*—John A. McPherson
(74) *Attorney, Agent, or Firm*—Nixon & Vanderhye, P.C.

(57) ABSTRACT

A method of making an array of corner cubes includes the steps of: preparing a substrate, at least a surface portion of which is made of a cubic crystalline material and which has a surface that is substantially parallel to {111} planes of the crystalline material; and patterning the surface of the substrate such that a plurality of solid shape elements defines a predetermined pattern on the surface of the substrate. Each of the solid shape elements is defined by a number of concave portions, a number of convex portions or a combination of concave and convex portions. The method further includes the step of supplying a first active species, including an element that is contained in the crystalline material, onto the substrate on which the solid shape elements have been formed.

27 Claims, 9 Drawing Sheets

OTHER PUBLICATIONS

U.S. Appl. No. 10/315,192, filed Dec. 2002, Ihara et al.

U.S. Appl. No. 10/327,951, filed Dec. 2002, Sawayama et al.

Neudeck et al; "Precision Crystal Corner Cube Arrays for Optical Gratings Formed by (100) Silicon Planes with Selective Epitaxial Growth"; Applied Optics, vol. 35, No. 19, Jul. 1, 1996, pp. 3466-3470.

Kaneko, Control of Atomic Arrangement by Inverse Epitaxy (Semiconductor Atomic Layer Process by On-the-Spot Etching Technique), "Reports of Research and Development Results in 1998 Academic Research Backup Project", Published by Hyogo Science and Technology Association, Nov. 1999 and partial English translation thereof.

"Encyclopedia of the eye, the web version", Okuzawa, Jul., 1999, pp. 1-22.

Hashimoto, K et al; "Invited Paper: Reflective Color Display Using Cholesteric Liquid Crystals"; SID International Symposium Digest of Technical Papers; May 1998; pp. 897-900; ISSN0098-966X.

* cited by examiner

*FIG.2A*      *FIG.2B*      *FIG.2C*
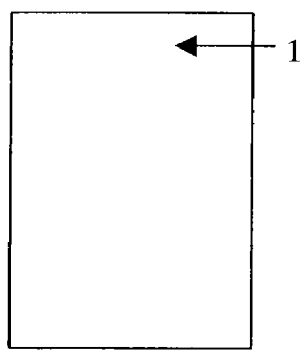
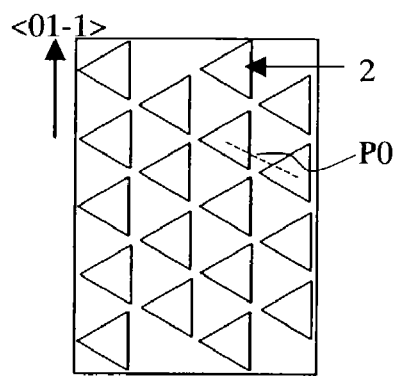
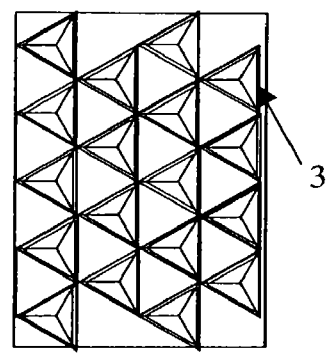
*FIG.2D*      *FIG.2E*
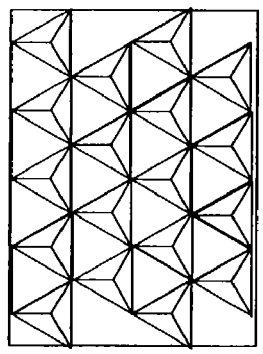
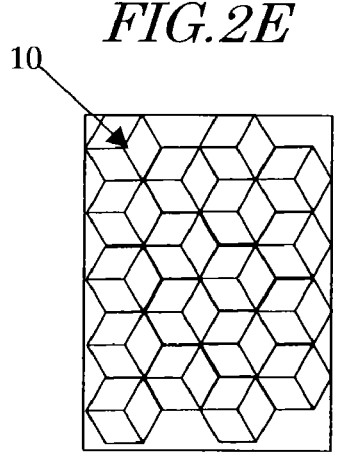

○ HIGHEST LEVEL
● LOWEST LEVEL

CORNER CUBE ARRAY AND METHOD OF MAKING THE CORNER CUBE ARRAY

BACKGROUND OF THE INVENTION

1. Field of the Invention

The present invention relates to a corner cube array and a method of making the corner cube array. More particularly, the present invention relates to a method of making a corner cube array of a very small size, which can be used effectively in a display device, for example.

2. Description of the Related Art

In recent years, various types of optical elements having extremely small sizes (i.e., so-called "micro optical elements"), including microlenses, micro mirrors and micro prisms, have been developed and applied more and more extensively to the fields of optical communications and display devices. It is expected that the optical technology and display technology will be further developed and advanced by realizing those micro optical elements.

Examples of such optical elements include a corner cube reflector, which is formed by arranging a plurality of corner cubes as an array with a regular pattern. Each of those corner cubes has a shape corresponding to one corner of a cube and three perpendicularly opposed reflective planes. The corner cube reflector is a type of retroreflector for reflecting an incoming light ray back to its source by getting the light ray reflected by each one of those reflective planes after another. The corner cube reflector can always reflect the incoming light ray back to its source irrespective of its angle of incidence. Hereinafter, conventional methods of making a corner cube array will be described.

Plate Method

In a plate method, a number of flat plates, each having two mutually parallel planes, are stacked one upon the other. At the side end face of these flat plates stacked, V-grooves are cut vertically to the parallel planes at an equal pitch, thereby forming a series of roof-shaped protrusions, each having an apical angle of approximately 90 degrees. Next, each of these flat plates is horizontally shifted with respect to adjacent one of them such that the tops of the series of roof-shaped protrusions, formed on the former plate, are aligned with the bottoms of the V-grooves formed on the latter plate. In this manner, a die for use to make a corner cube array is obtained. In the plate method, a corner cube array is made by using this die. According to this method, however, it is necessary to accurately shift and secure the flat plate having the roof-shaped protrusions with respect to the adjacent flat plate such that these two plates satisfy a required positional relationship. Thus, it is difficult to make an array of corner cubes of as small a size as about 100 µm or less by this method.

Pin Bundling Method

In a pin bundling method, the end of a hexagonal columnar metal pin is provided with a prism having three square facets that are opposed substantially perpendicularly to each other, and a number of such pins are bundled together to make a collection of prisms. In this manner, a corner cube is made up of three facets of three prisms that are formed at the respective ends of three adjacent pins. According to this method, however, a corner cube should be made by collecting multiple prisms that have been separately formed for mutually different pins. Thus, it is actually difficult to make a corner cube of a small size. The minimum possible size of a corner cube that can be formed by this method is about 1 mm.

Triangular Prism Method

In a triangular prism method, V-grooves are cut on the surface of a flat plate of a metal, for example, in three directions, thereby forming a plurality of triangular pyramidal protrusions and obtaining a collection of prisms. However, the prisms to be formed by this method can have no other shape but the triangular pyramidal shape.

Furthermore, Japanese Laid-Open Publication No. 7-205322 discloses a method of making a corner cube array by a photochemical technique. In this method, a photoresist film is patterned with a mask having a plurality of equilateral triangular transparent regions. Each of these transparent regions of this mask has variable transmittance that gradually decreases from its center toward its periphery. By performing exposing and developing process steps with such a mask, a number of triangular pyramidal photoresist pattern elements are formed on a substrate. Then, the substrate, which is partially covered with those photoresist pattern elements, is etched by a predetermined technique so as to have a plurality of protrusions in the same shape as the photoresist pattern elements. In this manner, an array of corner cubes can be formed on the substrate.

Furthermore, a technique of forming a cubic corner cube of a very small size, consisting of three square planes that are opposed perpendicularly to each other, is described in "Precision Crystal Corner Cube Arrays for Optical Gratings Formed by (100) Silicon Planes With Selective Epitaxial Growth", Applied Optics Vol. 35, No. 19, pp. 3466–3470. According to this technique, oxide pads for use to suppress the crystal growth are locally provided on (111) planes of a silicon substrate to cause a selective epitaxial growth of crystals on the substrate, thereby forming an array of corner cubes of a very small size thereon.

Such a corner cube reflector may be used in a display device such as a liquid crystal display. For example, U.S. Pat. No. 5,182,663 discloses a liquid crystal display device including a corner cube reflector. When used in a display device, however, a corner cube needs to have a very small size (e.g., about 100 µm or less). The reason is as follows. If the size of each corner cube (which will also be referred to herein as a "unit element") is greater than that of each pixel of the display device, then a light ray, which has been transmitted through a predetermined pixel region and then retro-reflected from the corner cube reflector, may pass through another pixel region on the way back. In that case, color mixture and other problems may occur.

However, according to any of the above-described mechanical methods of making corner cubes such as the plate method and the pin bundling method, it is often difficult to make corner cubes of such a small size as intended due to some variations that should occur in an actual manufacturing process. Also, even if a corner cube reflector can be made successfully by one of the methods described above, each reflective plane of the corner cube reflector should have a low specular reflectivity and the radius R of curvature at each intersection between two reflective planes should increase. As a result, the efficiency of retro-reflection may decrease disadvantageously. Furthermore, it is impossible to make a cubic corner cube, having a three-dimensional shape as a combination of convex and concave portions and consisting of three square planes that are opposed substantially perpendicularly to each other, by the triangular prism method.

Also, as for a micro corner cube obtained by a photochemical method as disclosed in Japanese Laid-Open Publication No. 7-205322, it is difficult to ensure high plane precision (i.e., planarity). In that method, the plane precision of each side surface of a micro corner cube depends on that of a triangular pyramidal photoresist pattern element on the substrate. However, to increase the plane precision of the photoresist pattern element, the processing steps of exposing and developing the photoresist layer should be controlled strictly enough by making the variation in transmittance or opacity of the mask constant, for example. Actually, though, such strict process control is hard to realize.

Furthermore, according to the method utilizing the selective growth of silicon as disclosed in Applied Optics Vol. 35, No. 19, pp. 3466–3470, it is difficult to control the lateral growth of crystals. Also, a film to be grown on a silicon substrate is likely deformed significantly at the contact surfaces with silicon dioxide pads to be provided on the silicon substrate to determine the corner cube pattern. Thus, it is not easy to make a micro corner cube array in its intended shape by such a method, either.

SUMMARY OF THE INVENTION

In order to overcome the problems described above, an object of the present invention is to provide a corner cube array having a very small size and a high shape precision and a method of making such a corner cube array.

A method of making an array of corner cubes according to a preferred embodiment of the present invention preferably includes the steps of: preparing a substrate, at least a surface portion of which is made of a cubic crystalline material and which has a surface that is substantially parallel to $\{111\}$ planes of the crystalline material; and patterning the surface of the substrate such that a plurality of solid shape elements defines a predetermined pattern on the surface of the substrate. Each of the solid shape elements is preferably defined by a number of concave portions, a number of convex portions or a combination of concave and convex portions. The method preferably further includes the step of supplying a first active species, including an element that is contained in the crystalline material, onto the substrate on which the solid shape elements have been formed.

In one preferred embodiment of the present invention, the step of supplying the first active species preferably results in forming corner cube unit elements according to the predetermined pattern of the solid shape elements.

In another preferred embodiment, the step of patterning the surface of the substrate preferably includes the step of subjecting the surface of the substrate to an anisotropic etching process.

In this particular preferred embodiment, the anisotropic etching process preferably includes a wet etching process.

Alternatively, the step of patterning the surface of the substrate may further include the step of defining an etching mask layer on the surface of the substrate, before performing the step of subjecting the surface of the substrate to the anisotropic etching process, such that a size of the corner cube unit elements is controlled according to a pattern of the etching mask layer. In a preferred embodiment, the etching mask layer preferably includes a plurality of masking elements, of which the median points are located substantially on honeycomb lattice points.

In still another preferred embodiment, the step of patterning the surface of the substrate preferably includes the step of making the solid shape elements out of the crystalline material.

In yet another preferred embodiment, the step of patterning the surface of the substrate preferably includes the step of defining the solid shape elements by $\{100\}$ planes of the crystalline material.

In yet another preferred embodiment, the crystalline material preferably has either a sphalerite structure or a diamond structure.

In yet another preferred embodiment, the step of supplying the first active species preferably includes the step of growing crystals anisotropically such that the growth rate thereof changes with a crystallographic plane orientation.

In this particular preferred embodiment, the step of growing the crystals preferably includes the step of defining corner cube unit elements by $\{100\}$ planes of the crystalline material.

In an alternative preferred embodiment, the step of preparing the substrate may include the step of preparing a substrate, at least the surface portion of which is made of gallium arsenide, and the step of growing the crystals may include the step of performing a vapor phase growth process using at least one of gallium or a compound including gallium and arsenic or a compound including arsenic as source material(s).

In yet another preferred embodiment, the step of supplying the first active species preferably includes the step of supplying a mixture of the first active species and a species, which contributes to etching the substrate, onto the substrate.

In this particular preferred embodiment, the step of preparing the substrate preferably includes the step of preparing a substrate, at least the surface portion of which is made of gallium arsenide, and the step of supplying the first active species preferably includes the step of performing a vapor phase etching process by supplying a halogen or a halogen compound and at least one of gallium or a compound including gallium and arsenic or a compound including arsenic onto the substrate.

In yet another preferred embodiment, the step of supplying the first active species preferably results in forming corner cube unit elements, each being defined by three $\{100\}$ planes that are opposed substantially perpendicularly to each other.

In this particular preferred embodiment, the three planes are preferably three approximately square planes that are opposed substantially perpendicularly to each other.

In yet another preferred embodiment, the method may further include the step of transferring the shape of the corner cube array, which has been formed on the surface of the substrate as a result of the step of supplying the first active species, onto another material.

A method of making an array of corner cubes according to another preferred embodiment of the present invention preferably includes the step of preparing a substrate, at least a surface portion of which is made of a cubic crystalline material, which has a surface that is substantially parallel to $\{111\}$ planes of the crystalline material, and on which a plurality of solid shape elements have been formed so as to define a predetermined pattern thereon. Each of the solid shape elements is preferably defined by a number of concave portions, a number of convex portions or a combination of concave and convex portions. The method preferably further includes the steps of: supplying a first active species, including an element that is contained in the crystalline material, onto the substrate on which the solid shape elements have been formed, thereby growing crystals anisotropically such that the growth rate thereof changes with a crystallographic plane orientation; and adjusting the shape of an exposed surface area of the substrate.

In one preferred embodiment of the present invention, the step of adjusting the shape of the exposed surface area of the substrate preferably includes the step of reducing unnecessary crystallographic planes, other than {100} planes of the crystalline material, in the exposed surface area of the substrate.

In another preferred embodiment, the step of adjusting the shape of the exposed surface area of the substrate preferably includes the steps of: performing a first patterning process on the substrate; and performing a second patterning process, which is a different type from the first patterning process, on the substrate. The step of performing the first patterning process preferably results in reducing the unnecessary crystallographic planes in a first portion of the exposed surface area of the substrate but newly generating other unnecessary crystallographic planes in a second portion of the exposed surface area of the substrate. The step of performing the second patterning process preferably results in reducing the unnecessary crystallographic planes in the second portion but newly generating other unnecessary crystallographic planes in the first portion.

In this particular preferred embodiment, the step of adjusting the shape of the exposed surface area of the substrate preferably includes the step of performing the first and second patterning processes alternately oh the substrate until the corner cube array has a retro-reflectivity of at least 95% as a result of reduction of the unnecessary crystallographic planes.

In yet another preferred embodiment, the step of adjusting the shape of the exposed surface area of the substrate preferably includes the step of removing portions of the exposed surface area of the substrate.

In yet another preferred embodiment, the step of adjusting the shape of the exposed surface area of the substrate preferably includes the step of supplying a second active species, which includes an element that is contained in the crystalline material and which is either the same as, or different from, the first active species, onto the substrate, thereby further growing the crystals anisotropically.

In yet another preferred embodiment, the step of performing the first patterning process preferably includes the step of removing portions of the exposed surface area of the substrate, and the step of performing the second patterning process preferably includes the step of supplying a second active species, which includes an element that is contained in the crystalline material and which is either the same as, or different from, the first active species, onto the substrate, thereby further growing the crystals anisotropically.

Specifically, the step of removing portions of the exposed surface area of the substrate preferably includes the step of performing an anisotropic etching process.

In yet another preferred embodiment, the step of adjusting the shape of the exposed surface area of the substrate preferably includes the step of supplying a mixture of a third active species, which includes an element that is contained in the crystalline material and which is either the same as, or different from, the first active species, and a species that contributes to etching the substrate.

In this particular preferred embodiment, the step of supplying the mixture preferably includes the step of etching the exposed surface area of the substrate anisotropically and growing the crystals thereon anisotropically at the same time.

In yet another preferred embodiment, the step of adjusting the shape of the exposed surface area of the substrate preferably includes the step of selectively etching, or growing crystals on, the exposed surface area of the substrate according to a crystallographic plane orientation of the crystalline material.

A corner cube array according to a preferred embodiment of the present invention is preferably provided on a substrate, at least a surface portion of which is made of a cubic crystalline material. The corner cube array preferably includes a plurality of solid shape elements, which are arranged in a predetermined pattern on the surface of the substrate that is substantially parallel to {111} planes of the crystalline material. Each of the solid shape elements is preferably defined by a number of concave portions, a number of convex portions or a combination of concave and convex portions. The corner cube array preferably further includes a crystal layer, which is provided on the solid shape elements by growing crystals thereon anisotropically with an active species, including an element that is contained in the crystalline material, supplied such that the growth rate of the crystals changes with a crystallographic plane orientation.

Other features, elements, processes, steps, characteristics and advantages of the present invention will become more apparent from the following detailed description of preferred embodiments of the present invention with reference to the attached drawings.

BRIEF DESCRIPTION OF THE DRAWINGS

FIGS. 2A through 2E are plan views illustrating structures obtained by the process steps shown in FIGS. 1A through 1E, respectively.

DETAILED DESCRIPTION OF PREFERRED EMBODIMENTS

Figure 1A:
FIGS. 1A through 1E are cross-sectional views illustrating respective process steps for making a corner cube array according to a first specific preferred embodiment of the present invention.

In a method of making a corner cube array according to a preferred embodiment of the present invention, a corner cube array is formed on a single crystalline substrate that is made of a cubic crystalline material (which will be referred to herein as a "cubic single crystalline substrate"). The cubic single crystalline substrate may be made of a compound semiconductor having a sphalerite structure or a crystalline material having a diamond structure, for example. It should be noted that the "substrate having a surface that is substantially parallel to {111} planes of a crystalline material" refers to herein not only a substrate having a surface that is parallel to the {111} planes of the crystalline material but also a substrate having a surface that defines a tilt angle of about 0 degrees to about 10 degrees with the {111} planes of the crystals. It should be noted that the "cubic single crystalline substrate" just needs to include at least a surface portion made of a cubic crystalline material and may be a substrate that is obtained by forming a single crystal layer on a supporting base member of an amorphous or polycrystalline material. Also, the substrate does not have to be a flat plate but may have any other three-dimensional shape as long as the substrate has a flat surface.

Specifically, first, a cubic single crystalline substrate is arranged such that the surface of the substrate is substantially parallel to {111} planes of a crystalline material. Next, solid shape elements are formed on the surface of the substrate so as to define a predetermined pattern thereon. Each of the solid shape elements may be defined by a number of concave portions, a number of convex portions or a combination of concave and convex portions. Thereafter, an active species, including an element that is contained in the cubic crystalline material (which will also be referred to herein as a "substrate material"), is supplied onto the substrate on which the solid shape elements, defined by those concave or convex portions. It should be noted that "supplying an active species, including an element contained in the cubic crystalline material, onto the substrate" typically refers to exposing the substrate to a gas or a liquid that includes the element contained in the crystalline material. For example, if the substrate is a gallium arsenide single crystalline substrate, the active species may be trimethylgallium or $AsCl_3$.

The step of supplying the active species preferably includes the step of growing crystals anisotropically such that the growth rate thereof changes with the specific crystallographic plane orientation. In this case, depending on the type of the active species supplied, a predetermined family of crystal planes may be grown selectively. However, the crystal-growing zones may be controlled by the shape or arrangement pattern of the solid shape elements that have been formed on the surface of the substrate. In other words, if the solid shape elements are formed in advance in an appropriate pattern or shape, then concave and convex portions, consisting of the predetermined family of planes of those crystals grown, can be arranged in a desired shape and in a predetermined pattern on the substrate. By utilizing such a method, a corner cube array, including a plurality of concave and convex portions defined by the predetermined family of crystal planes, can be formed on the substrate.

In a corner cube array formed by such a method, the three planes of each corner cube are a predetermined family of crystallographic planes of a cubic crystal and exhibit very high shape precision. Also, the three planes that make up each corner cube have good planarity, and each corner or edge, at which two or three of the planes intersect with each other, has sufficient sharpness. Furthermore, the corner cube array has a three-dimensional shape in which multiple unit elements, or corner cubes, are arranged in a regular pattern. In this array, the respective vertices of the corner cubes are located at substantially the same level (or within substantially the same plane). Thus, a retroreflector with a good retro-reflectivity can be obtained from such a corner cube array.

Also, the size of each unit element (i.e., each corner cube) in the corner cube array to be obtained by the method of the present invention is controllable by appropriately determining the arrangement pitch of the solid shape elements to be formed on the substrate. These solid shape elements may be formed by a wet etching process using a predetermined etching mask, for example. The arrangement pitch of the solid shape elements may be several tens μm or less. Then, an array of corner cubes having a size of several tens μm or less can be obtained. Thus, a micro corner cube array, which can be used effectively as a retroreflector in a liquid crystal display device, for example, can be obtained.

A method of forming a micro corner cube array on a cubic single crystalline substrate only by an anisotropic etching process was already disclosed in Japanese Patent Application No. 2001-181167, which was filed by the applicant of the present application. According to that method, however, corner cubes either cannot be formed in their intended shape, or may be made up of significantly deformed planes, unless the conditions of the etching process are defined appropriately. That is to say, to form a corner cube array in its desired shape by that method, it is necessary to select appropriate etching conditions, which is not so easy normally.

In contrast, if an active species is supplied onto a substrate after solid shape elements have been defined thereon as is done in a preferred embodiment of the present invention, a corner cube array can be formed in its desired shape relatively easily.

Hereinafter, preferred embodiments of the present invention will be described with reference to the accompanying drawings, in which members having substantially the same function are identified by the same reference numeral.

Embodiment 1

In a first specific preferred embodiment of the present invention, a substrate, made up of GaAs crystals having a sphalerite structure, is used as a cubic single crystalline substrate. The solid shape elements are formed on this substrate by a wet etching process so as to define a predetermined pattern thereon, and then an anisotropic crystal growth process is carried out on the solid shape elements on the substrate, thereby forming a micro corner cube array thereon.

FIGS. 1A through 1E and FIGS. 2A through 2E show respective process steps for making a micro corner cube array according to the first preferred embodiment of the present invention. First, as shown in FIGS. 1A and 2A, a GaAs substrate 1, of which the surface is substantially parallel to {111}B planes, is prepared, and has that surface mirror-polished. It should be noted that {111}A planes are formed by gallium atoms, while {111}B planes are formed by arsenic atoms.

Figure 1B:
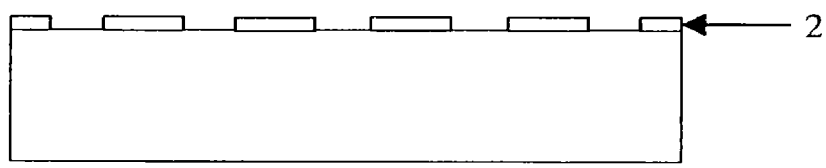

Next, as shown in FIGS. 1B and 2B, the surface of the substrate 1 is spin-coated with a positive photoresist layer with a thickness of about 1 μm. The photoresist layer may be made of OFPR-800 (produced by Tokyo Ohka Kogyo Co., Ltd.), for example. Subsequently, after the photoresist layer has been pre-baked at about 100° C. for approximately 30 minutes, a photomask is disposed on the photoresist layer to expose the photoresist layer to radiation through the mask.

Figure 3:
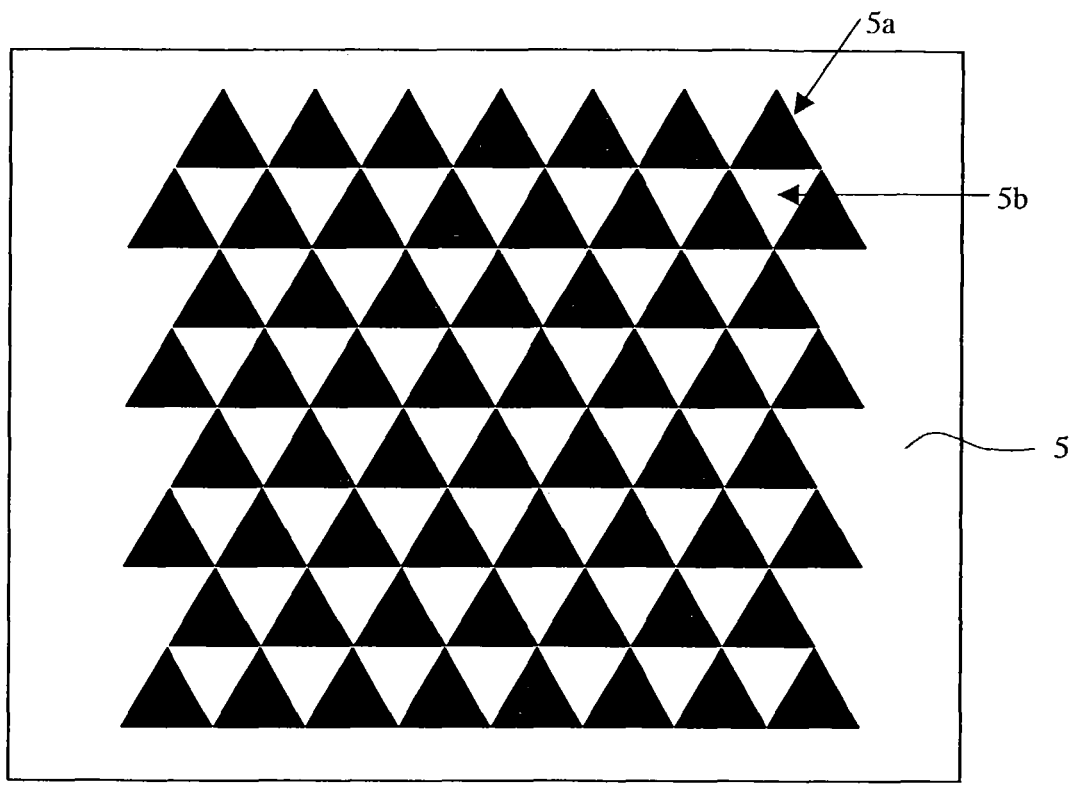
FIG. 3 is a plan view illustrating a photomask for use in the method of making a corner cube array according to the first preferred embodiment.

In this preferred embodiment, a photomask 5 such as that shown in FIG. 3 may be used. As shown in FIG. 3, in this photomask 5, equilateral triangular opaque regions 5a and inverse equilateral triangular transmissive regions 5b are alternately arranged in each of the three directions defined by the three sides of the triangles. The photomask 5 is arranged on the substrate 1 such that one of the three sides of each equilateral triangular pattern element representing an opaque region 5a is parallel to the <01-1> direction of the GaAs crystals. It should be noted that the negative sign preceding a direction index indicates herein that the direction index is negative. In this preferred embodiment, each equilateral triangular pattern element representing an opaque region 5a has a length of about 10 μm each side.

Thereafter, the exposed photoresist layer is developed with a developer NMD-32.38% (produced by Tokyo Ohka Kogyo Co., Ltd.), for example, thereby forming a photoresist pattern 2 on the substrate 1 as shown in FIGS. 1B and 2B. The photoresist pattern 2, which has been defined by using the photomask 5 shown in FIG. 3, is arranged on the substrate 1 such that one side of each equilateral triangular pattern element (i.e., the opaque region 5a) is parallel to the <01-1> direction of the GaAs crystals. In other words, the photoresist pattern 2 is arranged such that the three sides of each equilateral triangular pattern element thereof are parallel to {100} planes of the GaAs crystals. It should be noted that the photoresist pattern 2 will be sometimes referred to herein as "masking elements" and that those masking elements and the openings (i.e., holes formed by removing portions of the photoresist layer) will be sometimes referred to herein as an "etching mask layer" collectively.

In this preferred embodiment, the size of corner cubes to be formed may be controlled by the arrangement pitch of the photoresist pattern 2. More specifically, the size of the corner cubes becomes approximately equal to the pitch P0 of the masking elements of the photoresist pattern 2. In this preferred embodiment, the pitch P0 is preferably about 10 μm.

It should be noted that the pattern of the etching mask layer is not limited to that shown in FIG. 2B but may be any of various other patterns. However, to form corner cubes in their intended shape, the predetermined point (e.g., the median point) of each masking element of the photoresist pattern 2 in the etching mask layer is preferably located at a honeycomb lattice point. As used herein, the "honeycomb lattice points" refer to the vertices and median points of respective rectangular hexagons when a predetermined plane is densely packed with the hexagons of completely the same shape with no gaps left between them. The "honeycomb lattice points" also correspond to the intersections between first and second groups of parallel lines that are defined in a predetermined plane. In this case, when the first group of parallel lines extend in a first direction and are spaced apart from each other at regular intervals, the second group of parallel lines extend in a second direction so as to define an angle of 60 degrees with the first group of parallel lines and are spaced apart from each other at the same regular intervals as the first group of parallel lines. Also, each masking element of the etching mask layer preferably has a planar shape that is symmetrical about a three-fold rotation axis (e.g., a triangular or hexagonal shape).

Figure 1C:
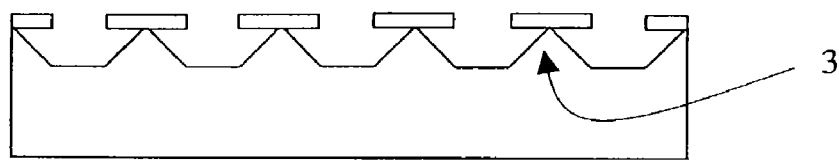

Next, as shown in FIGS. 1C and 2C, the substrate 1 is wet-etched while stirring an etchant with a magnet stirrer. In this preferred embodiment, the wet etching process may be carried out at a temperature of about 20° C. for approximately 60 seconds using a mixture of $NH_4OH:H_2O_2:H_2O=1:2:7$ as the etchant.

Figure 4:
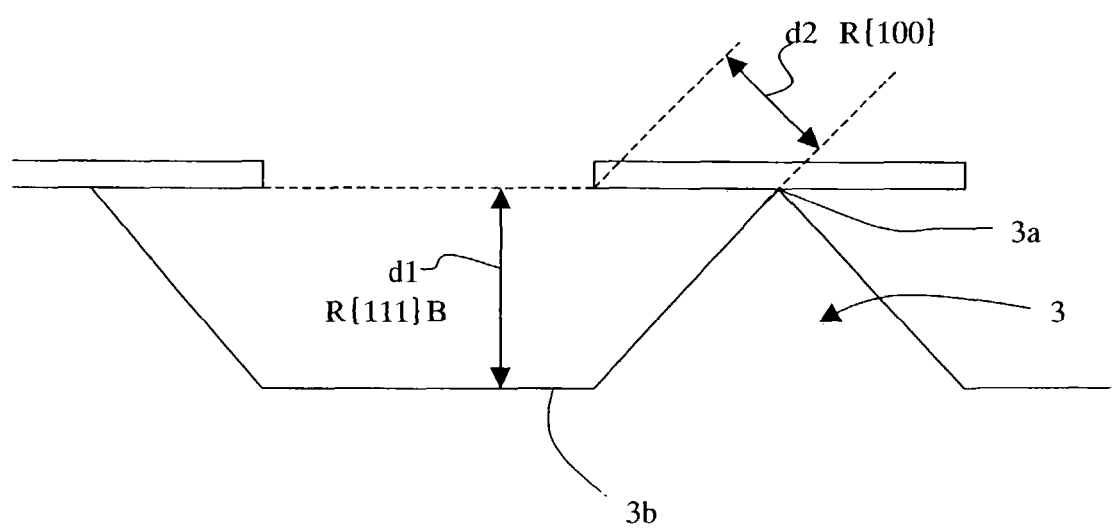
FIG. 4 is a schematic cross-sectional view showing how to define a solid shape element in the method of making a corner cube array according to the first preferred embodiment.

In this etching process, the {100} planes of the GaAs crystals, including the (100), (010) and (001) planes, are less easy to etch than the other crystallographic planes thereof. Thus, the etching process advances anisotropically so as to expose the {100} planes. However, in this etching process, the ratio of the etch rate R{111}B of the {111}B planes to the etch rate R{100} of the {100} planes is about 1.7. Thus, the etch depth d1 of an opening as defined by one of the {111}B planes and the etch depth d2 of the same opening as defined by one of {100} planes preferably satisfy the relationship shown in FIG. 4.

As a result, when a vertex 3a is formed, a solid shape element 3 including a bottom (i.e., a flat portion) 3b is completed. In this manner, in this preferred embodiment, a plurality of convex portions 3, each having a vertex under its associated masking element 2, are formed as solid shape elements on the surface of the substrate 1 as shown in FIGS. 1C and 2C.

Each of these convex portions 3 preferably has the shape of a triangular pyramid, which is made up of three rectangular isosceles triangular planes to be defined by three {100} planes that are opposed perpendicularly to each other. That is to say, each convex portion 3 has a triangular pyramidal shape corresponding to one corner of a cube. Also, these convex portions 3 are arranged such that their vertices are located on the honeycomb lattice points and so as to have their arrangement pitch substantially equalized with the pitch P0 of the masking elements of the resist pattern 2.

It should be noted that the unevenness to be created by the wet etching process is changeable with an etching condition such as the type of the etchant adopted or the etch time. For example, if the etch rate ratio R{111}B/R{100} is relatively high (e.g., about 1.8 or more), then the resultant flat portion 3b will have a decreased area as compared with the preferred embodiment shown in FIG. 4. Also, the solid shape elements arranged do not have to be a plurality of convex portions as described above but may also be a plurality of concave portions or a combination of concave and convex portions. Thus, in various preferred embodiments of the present invention, the solid shape elements to be arranged on the substrate are not always such triangular pyramidal convex portions but may have any other solid shape. In any case, however, those solid shape elements are preferably arranged such that their vertices are located on the honeycomb lattice points.

Figure 1D:
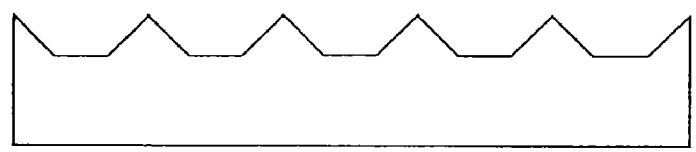

Subsequently, the substrate 1, on which the triangular pyramidal convex portions 3 define a predetermined pattern as a result of the anisotropic etching process described above, is subjected to ultrasonic cleaning using an organic solvent such as acetone, thereby removing the remaining unnecessary resist pattern 2 from the substrate 1 as shown in FIGS. 1D and 2D.

Thereafter, an anisotropic crystal growth process is carried out on the solid shape elements on the substrate by using a vapor deposition system. The vapor deposition system may be any of various known systems for use to deposit a thin film by an epitaxial growth process such as a vapor phase epitaxy (VPE) process, a molecular beam epitaxy (MBE) process, or a metal-organic vapor phase epitaxy (MOVPE)

process. Into the vapor deposition system, gases of trimethylgallium (Ga(CH$_3$)$_3$) and arsine (AsH$_3$) are introduced. The crystal growth process can be carried out just as intended by supplying these gases for about 100 minutes into an atmosphere at a reduced pressure of about 10 Torr while heating the substrate to about 630° C.

In this crystal growth process, the surface of the substrate is exposed to the gases that include the elements (i.e., gallium and arsenic) contained in the crystalline material (i.e., GaAs) of the substrate. That is to say, active species are supplied onto the substrate. However, since the solid shape elements (i.e., the convex portions 3 in this preferred embodiment) have already been formed on the surface of the substrate, the GaAs crystals hardly grow perpendicularly to the {111}B planes thereof but selectively grow perpendicularly to the {100} planes thereof. In other words, the active species that are contained in the trimethylgallium and arsine gases do not cause any reaction on the bottoms (i.e., the {111}B planes) but do accelerate crystal growth preferentially on the sidewalls (i.e., the {100} planes). In this manner, the crystal growth advances anisotropically such that the growth rate thereof changes with the specific crystallographic plane orientation.

In such a crystal growth process, crystals grow selectively on the predetermined family of crystal planes (i.e., the {100} planes in this preferred embodiment). In this case, the crystal growing zones may be determined by the specific pattern of the solid shape elements. Thus, if solid shape elements of a desired shape are arranged in advance in an appropriate pattern on the substrate, an array of corner cubes, each being made up of a predetermined family of crystal planes, can be formed.

It should be noted that the active species used to trigger the crystal growth is typically supplied as a gas that includes an element (i.e., gallium or arsenic in this preferred embodiment) contained in the crystalline material of the substrate. In this manner, as in the trimethylgallium and arsine gases described above, the gas including the active species is typically a gas of a molecule that includes an element contained in the crystalline material of the substrate (i.e., at least one of gallium, a gallium compound, arsenic and an arsenic compound in this preferred embodiment). This is because in that case, crystals can be grown appropriately so as to achieve lattice matching with the crystalline material of the surface portion of the substrate.

Figure 1E:
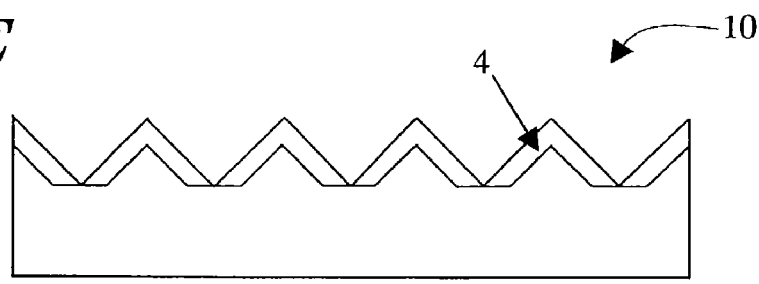
Figure 5A:
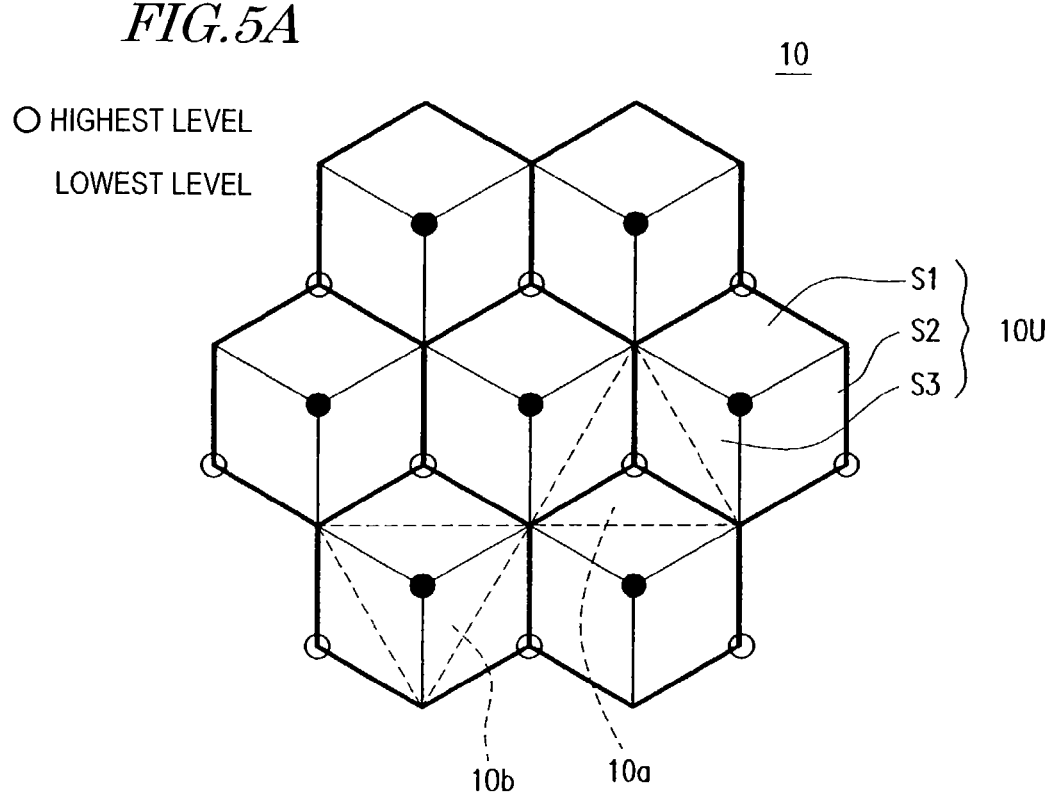
FIGS. 5A and 5B are respectively a plan view and a perspective view illustrating a portion of a corner cube array obtained by the method of the first, second or third preferred embodiment of the present invention.
Figure 5B:
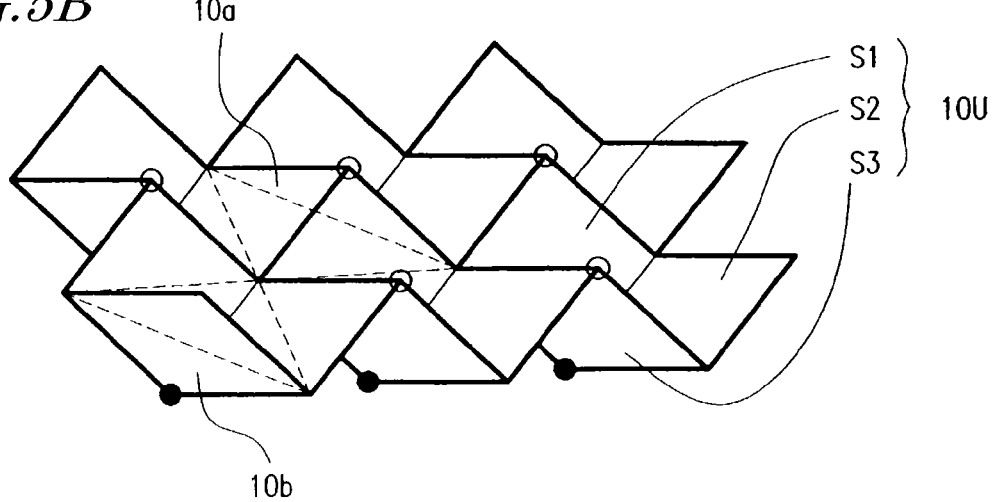

As a result of such an anisotropic selective crystal growth, a crystal layer 4 is formed on the convex portions 3. Consequently, a plurality of corner cube unit elements 10U, each being made up of three planes S1, S2 and S3 that are defined by three {100} planes of the crystals grown, are arranged as an array as shown in FIGS. 5A and 5B, thereby forming a corner cube array 10 as shown in FIGS. 1E and 2E. In this preferred embodiment, the three planes S1, S2 and S3 that make up each corner cube unit element 10U are three substantially square planes that are opposed substantially perpendicularly to each other. Also, as can be seen from FIGS. 5A and 5B, the corner cube array 10 obtained in this manner has a three-dimensional shape as a combination of convex portions 10a and concave portions 10b. When viewed from over the substrate, these corner cube unit elements 10U have a rectangular hexagonal shape.

Furthermore, the corner cube unit elements 10U are arranged in a pattern corresponding to the arrangement pattern of the convex portions 3. That is to say, the size of the corner cube unit elements may be determined by the arrangement pattern (or pitch) of the convex portions 3, which can be as small as about 10+ μm according to this preferred embodiment.

The corner cube array of this preferred embodiment may also be formed by using a different etching mask layer. Specifically, in the preferred embodiment described above, the anisotropic etching process is carried out with an etching mask layer in which the masking elements are arranged such that one of the three sides of the equilateral triangular masking elements is parallel to the <01-1> directions as shown in FIG. 2B. Alternatively, an etching mask layer, in which the masking elements are arranged such that one of the three sides of the equilateral triangular masking elements is parallel to the <011> directions of the GaAs crystals, may also be used.

If a wet etching process is carried out by using such an etching mask layer in a similar manner (i.e., such that the etch rate ratio R{111}B/R{100} becomes about 1.7), solid shape elements, consisting of concave portions and convex portions and having lowest-level points and highest-level points, are formed. In that case, however, the planes that make up each solid shape element might be deformed. Nevertheless, if such a substrate is subjected to a crystal growth process by operating the vapor deposition system under the same conditions as those described above, crystals can still be grown preferentially on the {100} planes. Thus, an array 10 of corner cubes, each being made up of three flat {100} planes, can also be obtained.

When the corner cube array obtained in this manner is used as a portion of a retroreflector, a thin film of a reflective material (e.g., aluminum or silver) may be deposited by an evaporation process, for example, to a substantially uniform thickness (e.g., about 200 nm) over the rugged surface of the GaAs substrate. In this manner, a corner cube reflector (i.e., a retroreflector including three substantially square reflective planes that are opposed substantially perpendicularly to each other) can be obtained. The resultant corner cube reflector can be used effectively in reflective liquid crystal display devices (e.g., a polymer-dispersed liquid crystal display device as disclosed in U.S. Pat. No. 5,182,663, for example) and in organic electroluminescent (EL) displays.

It should be noted that a mold for the corner cube array 10 may be obtained by an electroforming technique, for example, from the substrate 1 on which the corner cube array 10 has been formed. If the surface shape of the substrate 1 is transferred via such a mold onto a resin material by using a roller, for example, then the corner cube arrays can be mass-produced.

In the preferred embodiment described above, the substrate 1 is made of GaAs single crystals. Alternatively, the substrate 1 may also be made of single crystals of any other compound having a sphalerite structure, e.g., InP, InAs, ZnS or GaP. As another alternative, a substrate made of single crystals having a diamond structure (e.g., germanium crystals) may also be used.

Embodiment 2

Hereinafter, a second specific preferred embodiment of the present invention will be described.

In this second preferred embodiment, solid shape elements (i.e., convex portions in this preferred embodiment also) are formed by a wet etching process so as to define a predetermined pattern on the surface of a GaAs substrate. Then, those solid shape elements are dry-etched while active species, including the elements contained in the crystalline material of the substrate, are supplied onto the substrate, thereby forming a micro corner cube array.

Figure 6A:
FIGS. 6A through 6E are cross-sectional views illustrating respective process steps for making a micro corner cube array according to a second specific preferred embodiment of the present invention.
Figure 6B:
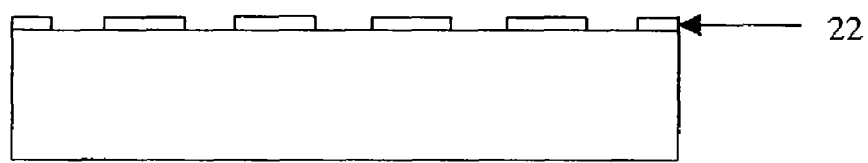
Figure 6C:
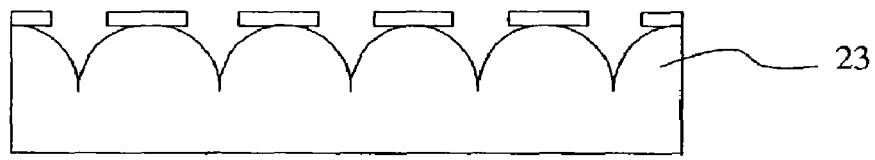
Figure 6D:
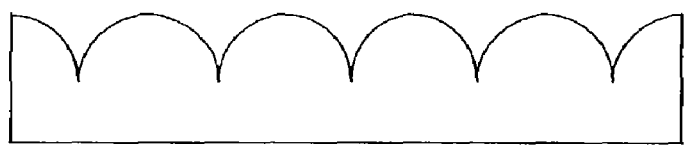
Figure 6E:
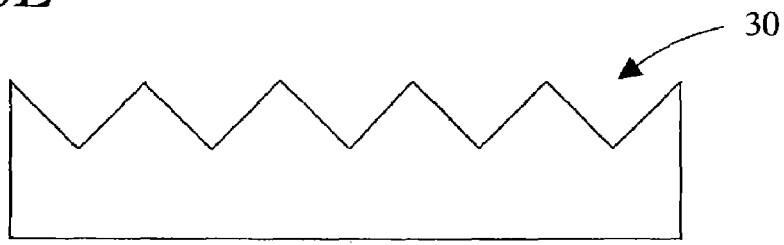
Figure 7A:
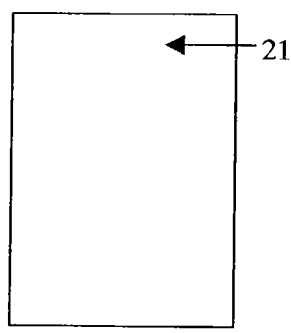
FIGS. 7A through 7E are plan views illustrating structures obtained by the process steps shown in FIGS. 6A through 6E, respectively.

FIGS. 6A through 6E and FIGS. 7A through 7E show respective process steps for making a micro corner cube array according to the second preferred embodiment of the present invention. First, as shown in FIGS. 6A and 7A, a GaAs substrate 21, of which the surface is substantially parallel to {111}B planes, is prepared, and has that surface mirror-polished as in the first preferred embodiment described above.

Figure 7B:
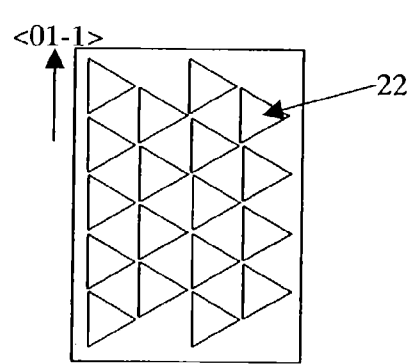

Next, as shown in FIGS. 6B and 7B, the surface of the substrate 21 is spin-coated with a photoresist layer with a thickness of about 1 µm and then exposing and developing process steps are carried out with the photomask 5 shown in FIG. 3 as in the first preferred embodiment described above. In this second preferred embodiment, the photomask 5 is arranged on the substrate 21 such that one of the three sides of each equilateral triangular pattern element representing an opaque region 5a is parallel to the <011> direction of the GaAs crystals. Thus, as shown in FIGS. 6B and 7B, a resist pattern 22, consisting of a plurality of substantially equilateral triangular masking elements (one of the three sides of which is parallel to the <011> directions of the GaAs crystals), is defined on the substrate 21. In this preferred embodiment, each equilateral triangular masking element of the resist pattern 22 has a length of about 10 µm each side.

Figure 7C:
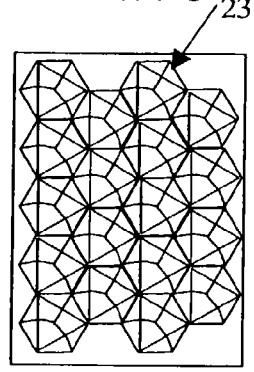

Next, as shown in FIGS. 6C and 7C, the substrate 21 is wet-etched while stirring an etchant with a magnet stirrer. As in the first preferred embodiment described above, the wet etching process may also be carried out at a temperature of about 20° C. for approximately 60 seconds using a mixture of $NH_4OH:H_2O_2:H_2O=1:2:7$ as the etchant.

In this etching process, the {100} planes of the GaAs crystals, including the (100), (010) and (001) planes, are less easy to etch than the other crystallographic planes thereof. Thus, the etching process advances anisotropically so as to expose the {100} planes. However, this etching process results in forming solid shape elements, consisting of concave and convex portions and having lowest-level points and highest-level points, because one of the three sides of each masking element is parallel to the <011> direction. Thus, the planes of the resultant solid shape elements might be deformed. Accordingly, rounded solid shape elements 23, which are similar in shape to the corner cube array, are formed on the substrate as shown in FIGS. 6C and 7C.

Figure 7D:
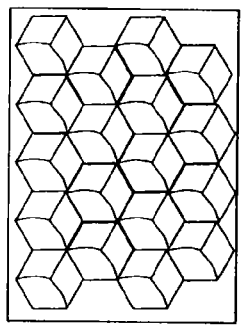
Figure 7E:
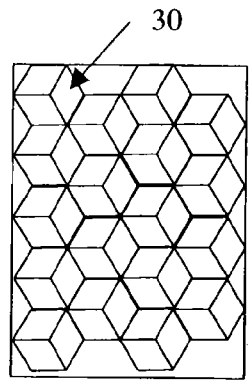

Subsequently, the substrate 21, including such solid shape elements 23, is subjected to ultrasonic cleaning for about 10 minutes, for example, using an organic solvent such as acetone, thereby removing the remaining unnecessary resist pattern 22 from the substrate 21 as shown in FIGS. 6D and 7D. Thereafter, the substrate 21, from which the resist pattern 22 has been stripped, is subjected to ethanol substitution, cleaned with running pure water for about 10 minutes, and then loaded into a vapor phase etching system. A known dry etching system may be used as the vapor phase etching system.

The vapor phase etching system is evacuated to a vacuum of about $10^{-8}$ Torr, the substrate 21 is heated to about 600° C. within the reduced pressure atmosphere, and then an etching gas and an additional gas, including an element that is contained in the crystalline material of the substrate (i.e., the active species), are supplied thereto for about 60 minutes. In this manner, a dry etching process is carried out such that the surface of the substrate is exposed to the etching gas and the additional gas simultaneously. In this preferred embodiment, an arsenic trichloride gas is preferably used as the etching gas and a trimethylgallium gas is preferably used as the additional gas.

In this dry etching process, the etching gas used causes a chemical reaction with the surface of the substrate. However, the reactivity of one family of crystal planes of the substrate to the etching gas should be different from that of another family of crystal planes of the substrate to the same etching gas. Thus, the rate at which the former family of crystal planes are etched with the etching gas should also be different from the rate at which the latter family of crystal planes are etched with the same etching gas. As a result, the dry etching process advances anisotropically so as to leave the {100} family of crystal planes. Furthermore, since not only the etching gas but also the additional gas (i.e., the active species including the element that is contained in the crystalline material in the surface portion of the substrate) are supplied onto the substrate at the same time, the {100} planes are formed at a higher rate and the flatness thereof can be increased.

It should be noted that the additional gas including the active species and the etching gas for use in this preferred embodiment are not limited to those mentioned above. Rather the additional gas may be any other gas including at least one of gallium, a gallium compound, arsenic and an arsenic compound. Also, a gas including halogen or a halogen compound can be used effectively as the etching gas.

Furthermore, the etching gas used preferably produces a gaseous reactant having a high vapor pressure when reacted with the substrate. For these reasons, a halogen compound gas such as the arsenic trichloride gas described above is preferably used as the etching gas. Examples of other preferred gases that satisfy these conditions include a hydrogen gas.

The technique of etching a GaAs substrate with an etching gas of a halogen compound has already been known in the art. For example, an etching process using hydrogen chloride gas is described in Surface Science 312, 181 (1994). An etching process using hydrogen trichloride is described in Journal of Crystal Growth 164, 97 (1994). Also, a method of etching a GaAs substrate with an etching gas of arsenic tribromide is described in Japanese Laid-Open Publication No. 8-321483. Each of these documents discloses that the etching process can be carried out with very high precision by using a halogen compound as an etchant. In this preferred embodiment, such a high-precision etching technique is used to make a micro corner cube array, thereby obtaining a reflector with a very high retro-reflectivity.

In this preferred embodiment, the etching process advances anisotropically so as to leave the {100} planes of crystals. However, by supplying the gas including the active species as described above, the crystal growth and etching processes can be both carried out appropriately and the {100} planes are formed just as intended. As a result, an array 30 of corner cubes, each being made up of three {100} planes, is obtained. The corner cube array 30 obtained in this manner has a similar shape to that of the corner cube array 10 of the first preferred embodiment shown in FIG. 5.

It should be noted that a mold for the corner cube array 30 may be obtained by an electroforming technique, for example, from the substrate 21 on which the corner cube array 30 has been formed. If the surface shape of the substrate 21 is transferred via such a mold onto a resin material by using a roller, for example, then the corner cube arrays can be mass-produced.

In the preferred embodiment described above, the substrate 21 is made of GaAs single crystals. Alternatively, the substrate 21 may also be made of single crystals of any other compound having a sphalerite structure, e.g., InP, InAs, ZnS or GaP. As another alternative, a substrate made of single crystals having a diamond structure (e.g., germanium crystals) may also be used.

Embodiment 3

In the first and second preferred embodiments described above, in the process step of supplying the first active species, an anisotropic crystal growth process is carried out on the solid shape elements on the substrate, thereby forming a plurality of corner cube unit elements, each being made up of three crystal planes that are defined by {100} planes. However, just by performing such an anisotropic crystal growth process, other families of crystal planes may be left on the exposed surface of the substrate.

Specifically, in the process step of supplying the first active species according to the first or second preferred embodiment described above, unnecessary families of crystal planes, other than the {100} planes to be defined, likely remain around the vertices of the respective unit elements. Even if the surface of the substrate is further patterned (e.g., etched) to reduce the percentage of those unnecessary families of crystal planes, other unnecessary families of crystal planes are highly likely created elsewhere. For that reason, it is normally difficult to reduce the percentage of those unnecessary families of crystal planes to a permissible range.

Thus, in this preferred embodiment, after the process step of supplying the first active species has been performed, the surface of the substrate is subjected to at least two different types of patterning processes to reduce the percentage of those unnecessary non {100} families of crystal planes to within the permissible range. Specifically, in this preferred embodiment, a type of patterning process, which can reduce unnecessary planes in a surface portion A of the substrate but creates other unnecessary planes in another surface portion B of the substrate, and another type of patterning process, which can reduce the unnecessary planes in the surface portion B but creates other unnecessary planes in the surface portion A, are repeatedly carried out alternately, thereby gradually decreasing the overall percentage of those unnecessary families of crystal planes over the substrate.

Hereinafter, a method of making a corner cube array according to the third preferred embodiment of the present invention will be described with reference to FIGS. 8A through 8I and FIGS. 9A through 9I. FIGS. 8A through 8I are plan views of the substrate in respective process steps. FIGS. 9A through 9I are cross-sectional views schematically showing the surface portion of the substrate in the respective process steps as viewed on the plane IX—IX shown in FIG. 8I.

Figure 8A:
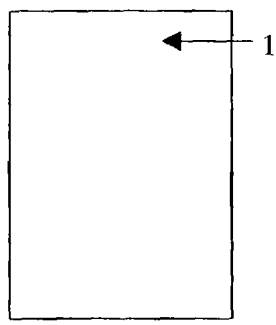
FIGS. 8A through 8I are plan views illustrating respective process steps for making a micro corner cube array according to a third specific preferred embodiment of the present invention.
Figure 9A:
FIGS. 9A through 9I are cross-sectional views illustrating structures obtained by the process steps shown in FIGS. 8A through 8I, respectively.

In this preferred embodiment, a substrate 1, made up of GaAs crystals having a sphalerite structure, is used as the cubic single crystalline substrate as shown in FIG. 8A. The surface of the substrate 1 is substantially parallel to the {111}B planes and is preferably mirror-polished as shown in FIG. 9A.

Figure 8B:
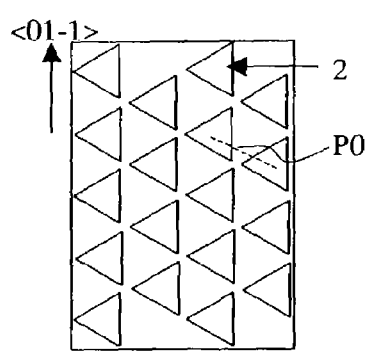
Figure 9B:
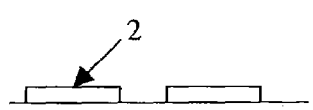

Next, as shown in FIGS. 8B and 9B, the surface of the substrate 1 is spin-coated with a positive photoresist layer with a thickness of about 1 μm. The photoresist layer may be made of OFPR-800 (produced by Tokyo Ohka Kogyo Co., Ltd.), for example. Subsequently, after the photoresist layer has been pre-baked at about 100° C. for approximately 30 minutes, a photomask is arranged on the photoresist layer to expose the photoresist layer to radiation through the mask.

In this preferred embodiment, the photomask 5 shown in FIG. 3 may also be used as in the first preferred embodiment described above. The photomask 5 is arranged on the substrate 1 such that one of the three sides of each equilateral triangular pattern element representing an opaque region 5a is parallel to the <01-1> direction of the GaAs crystals. In this preferred embodiment, each equilateral triangular pattern element representing the opaque region 5a has a length of about 10 μm each side.

Thereafter, the exposed photoresist layer is developed with a developer NMD-32.38% (produced by Tokyo Ohka Kogyo Co., Ltd.), for example, thereby forming a photoresist pattern 2 on the substrate 1 as shown in FIGS. 8B and 9B. The photoresist pattern 2, which has been defined by using the photomask 5 shown in FIG. 3, is arranged on the substrate 1 such that one side of each equilateral triangular pattern element (i.e., the opaque region 5a) is parallel to the <01-1> direction of the GaAs crystals. In other words, the photoresist pattern 2 is arranged such that the three sides of each equilateral triangular pattern element thereof are parallel to {100} planes of the GaAs crystals.

In this preferred embodiment, the size of corner cubes to be formed may be controlled by the arrangement pitch of the photoresist pattern 2. More specifically, the size of the corner cubes becomes approximately equal to the pitch P0 of the masking elements of the photoresist pattern 2. In this preferred embodiment, the pitch P0 is preferably about 10 μm.

It should be noted that the pattern of the etching mask layer is not limited to that shown in FIG. 8B but may be any of various other patterns. However, to form corner cubes in their intended shape, the predetermined point (e.g., the median point) of each masking element of the photoresist pattern 2 in the etching mask layer is preferably located at a honeycomb lattice point. As used herein, the "honeycomb lattice points" refer to the vertices and median points of respective rectangular hexagons when a predetermined plane is densely packed with the hexagons of completely the same shape with no gaps left between them. The "honeycomb lattice points" also correspond to the intersections between first and second groups of parallel lines that are defined in a predetermined plane. In this case, when the first group of parallel lines extend in a first direction and are spaced apart from each other at regular intervals, the second group of parallel lines extend in a second direction so as to define an angle of 60 degrees with the first group of parallel lines and are spaced apart from each other at the same regular intervals as the first group of parallel lines. Also, each masking element of the etching mask layer preferably has a planar shape that is symmetrical about a three-fold rotation axis (e.g., a triangular or hexagonal shape).

Figure 8C:
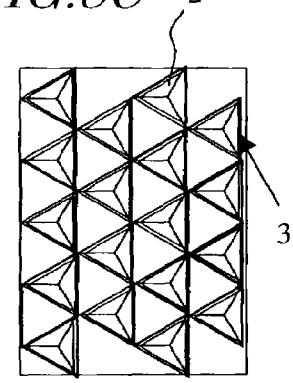
Figure 9C:
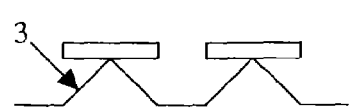

Next, as shown in FIGS. 8C and 9C, the substrate 1 is wet-etched while stirring an etchant with a magnet stirrer. In this preferred embodiment, the wet etching process may be carried out at a temperature of about 20° C. for approximately 60 seconds using a mixture of $NH_4OH:H_2O_2:H_2O=1:2:7$ as the etchant.

In this etching process, the {100} planes of the GaAs crystals, including the (100), (010) and (001) planes, are less easy to etch than the other crystallographic planes thereof. Thus, the etching process advances anisotropically so as to expose the {100} planes. However, in this etching process, the etch depth d1 of an opening as defined by one of the {111}B planes and the etch depth d2 of the same opening as defined by one of {100} planes preferably satisfy the relationship shown in FIG. 4 as already described for the first preferred embodiment.

As a result, when a vertex 3a is formed, a solid shape element 3 including a bottom (i.e., a flat portion) 3b is completed. In this manner, in this preferred embodiment, a plurality of convex portions 3, each having a vertex under its associated masking element 2, are formed as solid shape elements on the surface of the substrate 1 as shown in FIGS. 8C and 9C.

Each of these convex portions 3 preferably has the shape of a triangular pyramid, which is made up of three rectangular isosceles triangular planes to be defined by three {100} planes that are opposed perpendicularly to each other. That is to say, each convex portion 3 has a triangular pyramidal shape corresponding to one corner of a cube. Also, these convex portions 3 are arranged such that their vertices are located on the honeycomb lattice points and so as to have their arrangement pitch substantially equalized with the pitch P0 of the masking elements of the resist pattern 2.

It should be noted that the unevenness to be created by the wet etching process is changeable with an etching condition such as the type of the etchant adopted or the etch time. For example, if the etch rate ratio R{111}B/R{100} is relatively high (e.g., about 1.8 or more), then the resultant flat portion 3b will have a decreased area as compared with the preferred embodiment shown in FIG. 4. Also, the solid shape elements arranged do not have to be a plurality of convex portions as described above but may also be a plurality of concave portions or a combination of concave and convex portions. Thus, in various preferred embodiments of the present invention, the solid shape elements to be arranged on the substrate are not always such triangular pyramidal convex portions but may have any other solid shape. In any case, however, those solid shape elements are preferably arranged such that their vertices are located on the honeycomb lattice points.

Figure 8D:
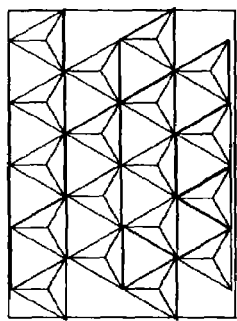
Figure 9D:
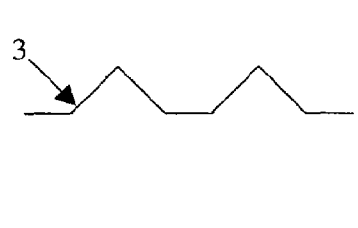

Subsequently, the substrate 1, on which the triangular pyramidal convex portions 3 define a predetermined pattern as a result of the anisotropic etching process described above, is subjected to ultrasonic cleaning using an organic solvent such as acetone, thereby removing the remaining unnecessary resist pattern 2 from the substrate 1 as shown in FIGS. 8D and 9D.

Thereafter, an anisotropic crystal growth process is carried out on the solid shape elements on the substrate by using a vapor deposition system. The vapor deposition system may be any of various known systems for use to deposit a thin film by an epitaxial growth process such as a vapor phase epitaxy (VPE) process, a molecular beam epitaxy (MBE) process, or a metal-organic vapor phase epitaxy (MOVPE) process. Into the vapor deposition system, gases of trimethylgallium ($Ga(CH_3)_3$) and arsine ($AsH_3$) are introduced. The crystal growth process can be carried out just as intended by supplying these gases for about 100 minutes into an atmosphere at a reduced pressure of about 10 Torr while heating the substrate to about 630° C.

It should be noted that the active species used to trigger the crystal growth is typically supplied as a gas that includes an element (i.e., gallium or arsenic in this preferred embodiment) contained in the crystalline material of the substrate. In this manner, as in the trimethylgallium and arsine gases described above, the gas including the active species is typically a gas of a molecule that includes an element contained in the crystalline material of the substrate (i.e., at least one of gallium, a gallium compound, arsenic and an arsenic compound in this preferred embodiment). This is because in that case, crystals can be grown appropriately so as to achieve lattice matching with the crystalline material of the surface portion of the substrate.

In this crystal growth process, the surface of the substrate is exposed to the gases that include the elements (i.e., gallium and arsenic) contained in the crystalline material (i.e., GaAs) of the substrate. That is to say, active species are supplied onto the substrate. However, since the solid shape elements (i.e., the convex portions 3 in this preferred embodiment) have already been formed on the surface of the substrate, the GaAs crystals hardly grow perpendicularly to the {111}B planes thereof but selectively grow perpendicularly to the {100} planes thereof. In other words, the active species that are contained in the trimethylgallium and arsine gases do not cause any reaction on the bottoms (i.e., the {111}B planes) but do accelerate crystal growth preferentially on the sidewalls (i.e., the {100} planes). In this manner, the crystal growth advances anisotropically such that the growth rate thereof changes with the specific crystallographic plane orientation.

Figure 8E:
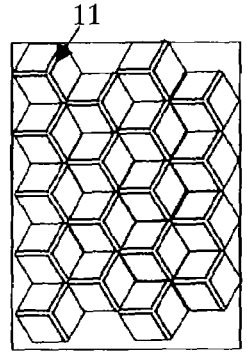

In such a crystal growth process, crystals grow selectively on the predetermined family of crystal planes (i.e., the {100} planes in this preferred embodiment). In this case, the crystal growing zones may be determined by the specific pattern of the solid shape elements that have been defined on the surface of the substrate. Thus, as shown in FIG. 8E, an array of unit elements, consisting mostly of {100} family of crystal planes (which will be sometimes referred to herein as an "initial unit element array"), is defined on the surface of the substrate. In the initial unit element array, non 100} families of crystal planes are exposed along the edge lines 11 of the respective convex portions.

Figure 9E:
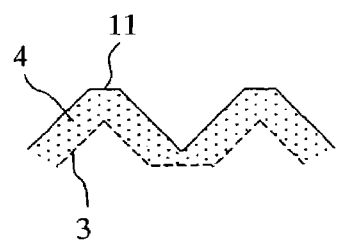

FIG. 9E is a cross-sectional view illustrating a portion of the substrate including the edge lines 11. As shown in FIG. 9E, a crystal layer 4 is formed on the convex portions 3 that have been defined by the etching process, and the edge lines 11 are defined by portions of the surface of the crystal layer 4. Each of these edge lines 11 typically includes triangular {111}B planes, which are created around the vertex of its associated convex portion, and {110} planes, which extend from the vertex and along the edges. These edge lines 11 are created because crystals grow relatively slowly in the <110> direction while the crystal layer 4 is being formed. Also, if the crystal growth process is continuously carried out under the same conditions, the edge lines 11 are going to expand.

Figure 8F:
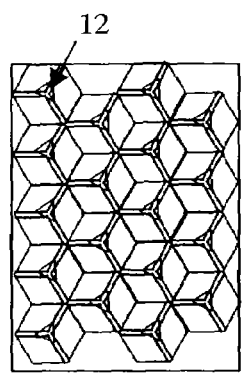
Figure 9F:
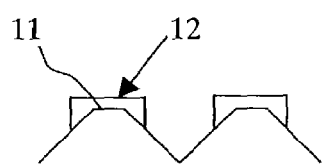

To remove these edge lines 11, a resist pattern 12 is defined as in FIG. 8B so as to cover the vertices of respective convex portions of the crystal layer 4 as shown in FIGS. 8F and 9F. In this process step, the area of each masking element of the resist pattern 12 is preferably smaller than that of its associated masking element of the resist pattern 2 shown in FIG. 8B.

Figure 8G:
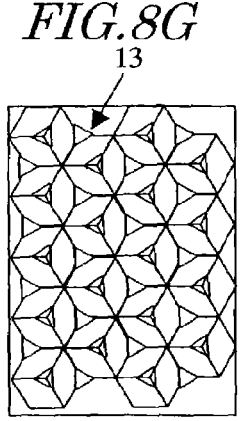
Figure 8H:
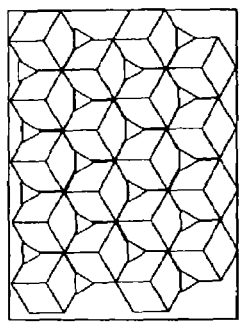
Figure 9G:
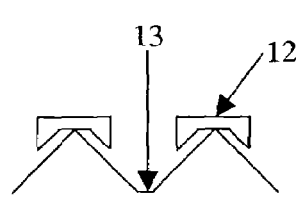
Figure 9H:
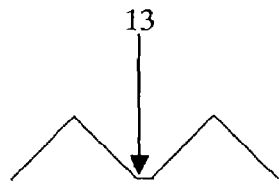

Next, as shown in FIGS. 8G and 9G, an anisotropic wet etching process is carried out. In this preferred embodiment, the wet etching process may be carried out at a temperature of about 20° C. for approximately 20 seconds using the same etchant (i.e., the mixture of $NH_4OH:H_2O_2:H_2O=1:2:7$) as that used in the process step shown in FIG. 8C. That is to say, the wet etching process shown in FIG. 8G is preferably carried out for a shorter time than the wet etching process shown in FIG. 8C. As a result of this wet etching process, the exposed surface of the substrate comes to have a cross-sectional shape such as that shown in FIG. 9G. As shown in FIG. 9G, the edge lines 11 now have a decreased area but triangular non {100} crystal planes (which will be referred to herein as "triangular regions 13") are exposed at the concave portions of the substrate because the etchant also achieves an etch rate ratio R{111}B/R{100} of about 1.7. However, the overall area of these triangular regions 13 is typically smaller than that of the counterparts existing in the concave portions shown in FIG. 8C. Thereafter, a process step similar to that shown in FIG. 8D is carried out, thereby removing the remaining unnecessary resist pattern 12 from the substrate 1 as shown in FIGS. 8H and 9H.

Figure 8I:
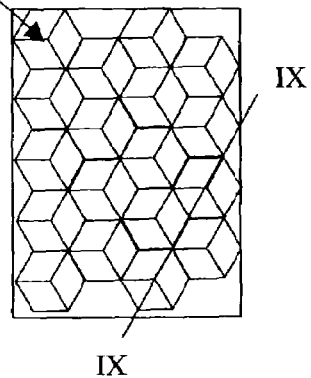
Figure 9I:
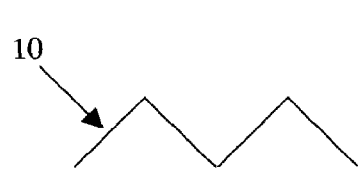

Thereafter, as shown in FIGS. 8I and 9I, the substrate 1 is subjected to the same crystal growth process again as that shown in FIG. 8E. The crystal growth process can be carried out just as intended by supplying the trimethylgallium (Ga(CH3)3) gas and arsine (AsH3) gas for about 20 minutes into an atmosphere at a reduced pressure of about 10 Torr while heating the substrate to about 630° C. That is to say, the crystal growth process shown in FIG. 8I is preferably carried out for a shorter time (i.e., about 20 minutes in this case) than the crystal growth process shown in FIG. 8E. As a result of this crystal growth process, the unnecessary crystal planes (i.e., the triangular regions 13) can be eliminated from the concave portions as shown in FIG. 9I and additional edge lines (not shown), having a smaller area than those shown in FIG. 8E, are newly formed on the convex portions. If the overall area of these additional edge lines 11 is equal to or smaller than a predetermined percentage, a corner cube array 10 of a good shape is completed. On the other hand, if the overall area of the additional edge lines is still greater than the predetermined percentage, then the etching process step shown in FIGS. 8F, 8G and 8H and the crystal growth process step shown in FIG. 8I are repeatedly carried out a number of times. The number of times of repetition may be changed depending on the necessity. In any case, the etching and crystal growth process steps are preferably carried out alternately until the overall area of the edge lines reaches the predetermined percentage (i.e., the permissible range described above). For example, these steps are carried out alternately until the retro-reflectivity of the corner cube array 10 reaches 95% as a result of reduction of the unnecessary crystallographic planes. The retro-reflectivity R2/R1 of the corner cube array 10 can be measured by a known reflectometer, where R1 is the intensity of the incoming light ray and R2 is the intensity of the reflected light ray. As a result, the corner cube array 10 obtained has so high a shape precision that the unnecessary crystal planes (i.e., the edge lines) are present at a very low percentage around the convex portions of the respective unit elements and almost no unnecessary crystal planes (i.e., the triangular regions) are present on the concave portions.

The corner cube array 10 obtained may basically have the same shape as the counterpart of the first preferred embodiment that has already been described with reference to FIGS. 5A and 5B. That is to say, a plurality of corner cube unit elements 10U, each being made up of three planes S1, S2 and S3 that are defined by three {100} planes of the crystals grown, are arranged as an array. In this preferred embodiment, the three planes S1, S2 and S3 that make up each corner cube unit element 10U are three substantially square planes that are opposed substantially perpendicularly to each other. Also, as can be seen from FIGS. 5A and 5B, the corner cube array 10 obtained in this manner has a three-dimensional shape as a combination of convex portions 10a and concave portions 10b. When viewed from over the substrate, these corner cube unit elements 10U have a rectangular hexagonal shape.

Furthermore, the corner cube unit elements 10U are arranged in a pattern corresponding to the arrangement pattern of the convex portions 3. That is to say, the size of the corner cube unit elements may be determined by the arrangement pattern (or pitch) of the convex portions 3, which can be as small as about 10+µm according to this preferred embodiment.

As described above, in the method of making a micro corner cube array according to the third preferred embodiment, an initial unit element array, consisting mostly of {100} planes, are formed by an anisotropic crystal growth process on the substrate, and then the shape of the initial unit element array is adjusted by performing at least two different types of patterning processes on the substrate. Specifically, first, a wet etching process is performed as a first patterning process to reduce the unnecessary crystal planes that have been generated by the anisotropic crystal growth process. Next, a crystal growth process is carried out as a second patterning process to reduce additional unnecessary crystal planes that have been created by the wet etching process as the first patterning process. Thereafter, the first and second patterning processes are repeatedly carried out alternately depending on the necessity, thereby minimizing the percentage of unnecessary non {100} crystal planes included in the initial unit element array. As a result, a corner cube array with an even higher shape precision can be obtained.

In the preferred embodiment described above, solid shape elements are formed by a wet etching process on the substrate 1 and then the initial unit element array is formed on the substrate 1 by performing the anisotropic crystal growth process thereon. However, the initial unit element array may also be formed by a different method. For example, as disclosed in Applied Optics Vol. 35, No. 19, pp. 3466–3470, the initial unit element array may also be defined by forming the solid shape elements on the substrate using an SiO₂ pad and then performing a crystal growth process thereon. Thereafter, the surface of the substrate 1, including the initial unit element array thereon, is repeatedly subjected to the two different types of patterning processes as is done in the preferred embodiment described above. The percentage of the unnecessary non {100} crystal planes to be included in each unit element of the initial unit element array can also be reduced in this manner.

It should be noted that the two types of patterning processes to be carried out to reduce the non {100} crystal planes are not limited to the example described above but may also be any other arbitrary combination as long as it satisfies the complementary relationship described above. The unnecessary crystal planes may also be created by those patterning processes in other locations, not just those mentioned above.

FIGS. 10A through 10D are schematic cross-sectional views illustrating an alternative technique of reducing the percentage of the unnecessary crystal planes included in the initial unit element array by performing the two types of patterning processes repeatedly.

Figure 10A:
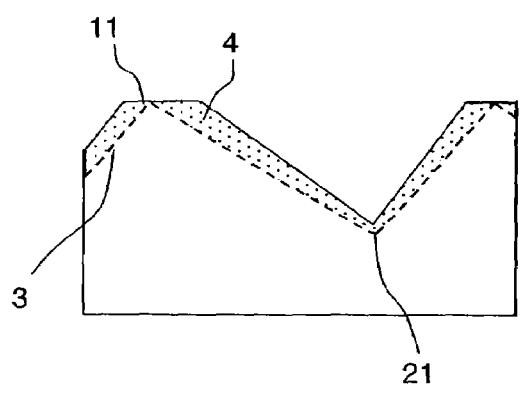
FIGS. 10A through 10D are schematic cross-sectional views illustrating alternative etching process steps according to the third preferred embodiment.

First, as in the process steps shown in FIGS. 8A through 8D, the surface of the substrate is wet-etched anisotropically and then the resist pattern is removed. Thereafter, when the crystal growth process is performed by the technique shown in FIG. 8E, the initial unit element array is formed. FIG. 10A is a cross-sectional view illustrating a surface portion of the substrate on which the initial unit element array has been defined. This surface portion of the substrate consists of {100} planes except for the edge lines 11 (with a width of about 2.2 µm).

Figure 10B:
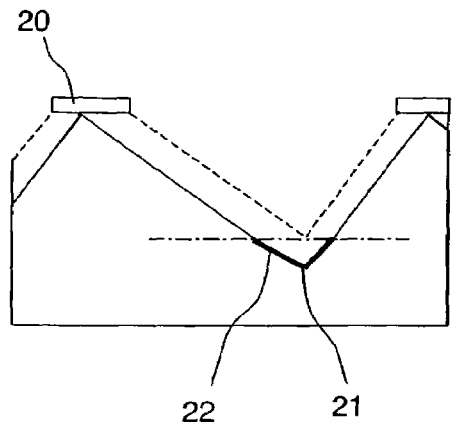

If the surface of the substrate 1, including the initial unit element array thereon, is wet-etched using the resist pattern 20, then the unnecessary crystal planes, which made up the edge lines 11, can be eliminated but the bottom 21 of the concave portion of the substrate 1 comes to have a warped portion 22 as shown in FIG. 10B. The warped portion 22 is a region, in which a huge number of steps, having {100} planes as terraces are formed at an atomic level, and defines slopes around the {100} planes when viewed macroscopically.

Figure 10C:
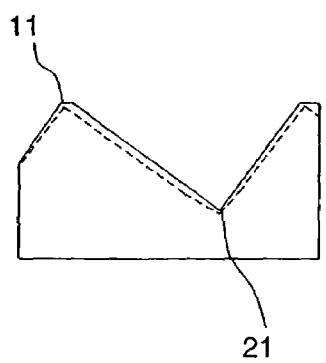
Figure 10D:
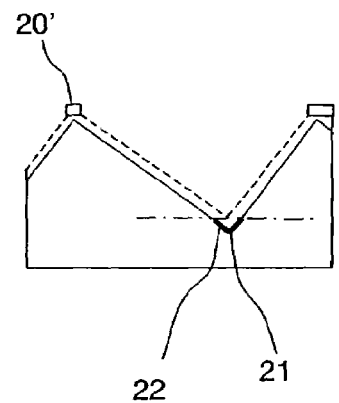

Subsequently, a crystal growth process is carried out as in the process step shown in FIG. 8E. In this case, however, the crystal growth process is preferably carried out for a shorter time than the crystal growth process shown in FIG. 8E. As a result of this crystal growth process, the warped portion 22, which existed at the bottom 21 of the concave portion of the substrate 1, can be eliminated, but edge lines 11 (with a width of about 1.5 μm) are newly formed on the convex portions as shown in FIG. 10C. Nevertheless, the overall area of the edge lines 11 shown in FIG. 10C is smaller than that of the edge lines 11 shown in FIG. 10A. Thereafter, when a wet etching process is carried out again using a resist pattern 20', in which each masking element has a smaller area than the counterpart shown in FIG. 10A, a warped portion 22 is also formed at the bottom 21 of each concave portion as shown in FIG. 10D. However, the area of the warped portion 22 shown in FIG. 10D is much smaller than that of the warped portion 22 shown in FIG. 10B. By repeatedly performing the crystal growth and etching processes in this manner, the overall area of the unnecessary crystal planes, defining the edge lines 11 and warped portion 22, can be reduced gradually. As a result, a corner cube array 10 with an excellent retro-reflectivity can be obtained.

According to this preferred embodiment, a corner cube array 10, in which the percentage of unnecessary crystal planes other than the {100} planes has been reduced significantly, can be obtained by repeatedly performing the at least two types of patterning processes. However, those unnecessary crystal planes cannot be totally eliminated from the resultant corner cube array 10, although their number normally falls within a permissible range. The locations, areas and shapes of the remaining unnecessary crystal planes are changeable with the types, conditions and number of repetition of the patterning processes. For example, the shapes and locations of the unnecessary crystal planes in the resultant corner cube array 10 change depending on which of the at least two types of patterning processes is carried out last. Hereinafter, a specific exemplary situation will be described.

In the manufacturing processes that have already been described with reference to FIGS. 8A through 8I and FIGS. 10A through 10D, the etching process step and crystal growth process step are alternately carried out repeatedly to reduce the overall area of the unnecessary crystal planes. Specifically, if the repetitive process shown in FIGS. 8A through 8I ends with the etching process step, then the resultant corner cube array 10 will have unnecessary triangular planes (i.e., a triangular region) at each concave portion. However, the area of the triangular region should be smaller than that of the triangular region 13 shown in FIG. 8G. In the same way, if the repetitive process shown in FIGS. 10A through 10D ends with the etching process step, the resultant corner cube array 10 will have a warped region, including unnecessary planes, at the bottom. However, the area of the warped region should be smaller than that of the warped region 22 shown in FIG. 10B. On the other hand, if the repetitive process shown in FIGS. 8A through 8I or FIGS. 10A through 10D ends with the crystal growth process, then the resultant corner cube array 10 will have an edge line, including unnecessary planes, at the vertex. However, the area of the edge line should be smaller than that of the edge line 11 shown in FIG. 8E or 10A.

To achieve a high retro-reflectivity, the bottom (i.e., concave portion) of each corner cube preferably has the intended planar shape. Accordingly, if the repetitive process ends with the etching process step, the shape of the corner cube array 10 is preferably transferred either once or an odd number of times. Then, a corner cube array including no unnecessary crystal planes at the bottom can be obtained. On the other hand, if the repetitive process ends with the crystal growth process step, no unnecessary crystal planes will be left at the bottom. Thus, the corner cube array 10 itself, made of a GaAs substrate, for example, can exhibit a sufficiently high retro-reflectivity. Alternatively, if the shape of the corner cube array 10 is transferred an even number of times, a corner cube array with such a shape as achieving a high retro-reflectivity can be obtained.

In this manner, according to this preferred embodiment, the locations of unnecessary crystal planes in the resultant corner cube array 10 are controllable by changing the types of the process step to be carried out at the end of the repetitive patterning process. Thus, a retroreflector having such a corner cube array shape as achieving an excellent retro-reflectivity can be obtained by using this corner cube array 10.

The corner cube array of this preferred embodiment may also be formed by using a different etching mask layer. Specifically, in the preferred embodiment described above, the anisotropic etching process is carried out with an etching mask layer in which the masking elements are arranged such that one of the three sides of the equilateral triangular masking elements is parallel to the <01-1> directions as shown in FIG. 8B. Alternatively, an etching mask layer, in which the masking elements are arranged such that one of the three sides of the equilateral triangular masking elements is parallel to the <011> directions of the GaAs crystals, may also be used.

When the corner cube array obtained in this manner is used as a portion of a retroreflector, a thin film of a reflective material (e.g., aluminum or silver) may be deposited by an evaporation process, for example, to a substantially uniform thickness (e.g., about 200 nm) over the rugged surface of the GaAs substrate. In this manner, a corner cube reflector (i.e., a retroreflector including three substantially square reflective planes that are opposed substantially perpendicularly to each other) can be obtained. The resultant corner cube reflector can be used effectively in reflective liquid crystal display devices (e.g., a polymer-dispersed liquid crystal display device as disclosed in U.S. Pat. No. 5,182,663, for example) and in organic electroluminescent (EL) displays.

It should be noted that a mold for the corner cube array 10 may be obtained by an electroforming technique, for example, from the substrate 1 on which the corner cube array 10 has been formed. If the surface shape of the substrate 1 is transferred via such a mold onto a resin material by using a roller, for example, then the corner cube arrays can be mass-produced.

In the preferred embodiment described above, the substrate 1 is made of GaAs single crystals. Alternatively, the substrate 1 may also be made of single crystals of any other compound having a sphalerite structure, e.g., InP, InAs, ZnS or GaP. As another alternative, a substrate made of single crystals having a diamond structure (e.g., germanium crystals) may also be used.

According to various preferred embodiments of the present invention described above, the surface of a cubic single crystalline substrate, which is substantially parallel to {111} planes of the crystalline material thereof, is patterned into a plurality of solid shape elements (each being made up of a number of concave portions, a number of convex portions or a combination of concave and convex portions) that defines a predetermined pattern thereon. Thereafter, an active species, including an element that is also contained in the crystalline material of the surface portion of the substrate, is supplied onto the substrate, thereby forming a micro corner cube array with a very high shape precision. A corner cube reflector with an excellent retro-reflectivity can be obtained from such a corner cube array.

While the present invention has been described with respect to preferred embodiments thereof, it will be apparent to those skilled in the art that the disclosed invention may be modified in numerous ways and may assume many embodiments other than those specifically described above. Accordingly, it is intended by the appended claims to cover all modifications of the invention that fall within the true spirit and scope of the invention.

What is claimed is:

1. A method of making an array of corner cubes, the method comprising the steps of:
    preparing a substrate, at least a surface portion of which is made of a cubic crystalline material and which has a surface that is substantially parallel to {111} planes of the crystalline material;
    patterning the surface of the substrate such that a plurality of solid shape elements defines a predetermined pattern on the surface of the substrate, each of the solid shape elements being defined by a number of concave portions, a number of convex portions or a combination of concave and convex portions; and
    supplying a first active species, including an element that is contained in the crystalline material, onto the substrate on which the solid shape elements have been formed.

2. The method of claim 1, wherein the step of supplying the first active species results in forming corner cube unit elements according to the predetermined pattern of the solid shape elements.

3. The method of claim 1, wherein the step of patterning the surface of the substrate includes the step of subjecting the surface of the substrate to an anisotropic etching process.

4. The method of claim 3, wherein the anisotropic etching process includes a wet etching process.

5. The method of claim 3, wherein the step of patterning the surface of the substrate further includes the step of defining an etching mask layer on the surface of the substrate, before performing the step of subjecting the surface of the substrate to the anisotropic etching process, such that a size of the corner cube unit elements is controlled according to a pattern of the etching mask layer.

6. The method of claim 1, wherein the step of patterning the surface of the substrate includes the step of making the solid shape elements out of the crystalline material.

7. The method of claim 1, wherein the step of patterning the surface of the substrate includes the step of defining the solid shape elements by {100} planes of the crystalline material.

8. The method of claim 1, wherein the step of supplying the first active species includes the step of growing crystals anisotropically such that the growth rate thereof changes with a crystallographic plane orientation.

9. The method of claim 8, wherein the step of growing the crystals includes the step of defining corner cube unit elements by {100} planes of the crystalline material.

10. The method of claim 8, wherein the step of preparing the substrate includes the step of preparing a substrate, at least the surface portion of which is made of gallium arsenide, and
    wherein the step of growing the crystals includes the step of performing a vapor phase growth process using at least one of gallium or a compound including gallium and arsenic or a compound including arsenic as source material(s).

11. The method of claim 1, wherein the step of supplying the first active species includes the step of supplying a mixture of the first active species and a species, which contributes to etching the substrate, onto the substrate.

12. The method of claim 11, wherein the step of preparing the substrate includes the step of preparing a substrate, at least the surface portion of which is made of gallium arsenide, and
    wherein the step of supplying the first active species includes the step of performing a vapor phase etching process by supplying a halogen or a halogen compound and at least one of gallium or a compound including gallium and arsenic or a compound including arsenic onto the substrate.

13. The method of claim 1, wherein the step of supplying the first active species results in forming corner cube unit elements, each being defined by three {100} planes that are opposed substantially perpendicularly to each other.

14. The method of claim 13, wherein the three planes are three approximately square planes that are opposed substantially perpendicularly to each other.

15. The method of one of claim 1, further comprising the step of transferring the shape of the corner cube array, which has been formed on the surface of the substrate as a result of the step of supplying the first active species, onto another material.

16. A method of making an array of corner cubes, the method comprising the steps of:
    preparing a substrate, at least a surface portion of which is made of a cubic crystalline material, which has a surface that is substantially parallel to {111} planes of the crystalline material, and on which a plurality of solid shape elements have been formed so as to define a predetermined pattern thereon, each of the solid shape elements being defined by a number of concave portions, a number of convex portions or a combination of concave and convex portions;
    supplying a first active species, including an element that is contained in the crystalline material, onto the substrate on which the solid shape elements have been formed, thereby growing crystals anisotropically such that the growth rate thereof changes with a crystallographic plane orientation; and
    adjusting the shape of an exposed surface area of the substrate.

17. The method of claim 16, wherein the step of adjusting the shape of the exposed surface area of the substrate includes the step of reducing unnecessary crystallographic planes, other than {100} planes of the crystalline material, in the exposed surface area of the substrate.

18. The method of claim 16, wherein the step of adjusting the shape of the exposed surface area of the substrate includes the steps of:
    performing a first patterning process on the substrate; and
    performing a second patterning process, which is a different type from the first patterning process, on the substrate, wherein the step of performing the first patterning process results in reducing the unnecessary crystallographic planes in a first portion of the exposed surface area of the substrate but newly generating other unnecessary crystallographic planes in a second portion of the exposed surface area of the substrate, and wherein the step of performing the second patterning process results in reducing the unnecessary crystallographic planes in the second portion but newly generating other unnecessary crystallographic planes in the first portion.

19. The method of claim 18, wherein the step of adjusting the shape of the exposed surface area of the substrate includes the step of performing the first and second patterning processes alternately on the substrate until the corner cube array has a retro-reflectivity of at least 95% as a result of reduction of the unnecessary crystallographic planes.

20. The method of one of claim 16, wherein the step of adjusting the shape of the exposed surface area of the substrate includes the step of removing portions of the exposed surface area of the substrate.

21. The method of claim 20, wherein the step of removing portions of the exposed surface area of the substrate includes the step of performing an anisotropic etching process.

22. The method of one of claim 16, wherein the step of adjusting the shape of the exposed surface area of the substrate includes the step of supplying a second active species, which includes an element that is contained in the crystalline material and which is either the same as, or different from, the first active species, onto the substrate, thereby further growing the crystals anisotropically.

23. The method of one of claim 16, wherein the step of performing the first patterning process includes the step of removing portions of the exposed surface area of the substrate, and wherein the step of performing the second patterning process includes the step of supplying a second active species, which includes an element that is contained in the crystalline material and which is either the same as, or different from, the first active species, onto the substrate, thereby further growing the crystals anisotropically.

24. The method of one of claim 16, wherein the step of adjusting the shape of the exposed surface area of the substrate includes the step of supplying a mixture of a third active species, which includes an element that is contained in the crystalline material and which is either the same as, or different from, the first active species, and a species that contributes to etching the substrate.

25. The method of claim 24, wherein the step of supplying the mixture includes the step of etching the exposed surface area of the substrate anisotropically and growing the crystals thereon anisotropically at the same time.

26. The method of one of claim 16, wherein the step of adjusting the shape of the exposed surface area of the substrate includes the step of selectively etching, or growing crystals on, the exposed surface area of the substrate according to a crystallographic plane orientation of the crystalline material.

27. A corner cube array provided on a substrate, at least a surface portion of which is made of a cubic crystalline material, the corner cube array comprising:

a plurality of solid shape elements, which are arranged in a predetermined pattern on the surface of the substrate, the surface being substantially parallel to {111} planes of the crystalline material, each of the solid shape elements being defined by a number of concave portions, a number of convex portions or a combination of concave and convex portions; and a crystal layer, which is provided on the solid shape elements by growing crystals thereon anisotropically with an active species, including an element that is contained in the crystalline material, supplied such that the growth rate of the crystals changes with a crystallographic plane orientation.

* * * * *